United States Patent
DeCia et al.

(10) Patent No.: US 10,093,138 B2
(45) Date of Patent: Oct. 9, 2018

(54) MONITORING TIRES OF VEHICLES VIA PERSONAL AREA NETWORKS

(71) Applicant: Ford Global Technologies, LLC, Dearborn, MI (US)

(72) Inventors: Nunzio DeCia, Northville, MI (US); David A Herman, Southfield, MI (US); Arun Dutta, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/432,844

(22) Filed: Feb. 14, 2017

(65) Prior Publication Data

US 2018/0229560 A1 Aug. 16, 2018

(51) Int. Cl.
*B60C 23/04* (2006.01)
*B60C 23/02* (2006.01)

(52) U.S. Cl.
CPC .......... *B60C 23/0486* (2013.01); *B60C 23/02* (2013.01)

(58) Field of Classification Search
CPC ... B60C 23/002; B60C 23/02; B60C 23/0408; B60C 23/0416; B60C 23/0433; B60C 23/0484; B60C 23/0486; B60C 23/0488; B60C 23/0493; B60C 23/06; G01M 17/02; H01Q 5/0027
USPC .......................................................... 340/422
See application file for complete search history.

(56) References Cited

U.S. PATENT DOCUMENTS

2003/0030553 A1* 2/2003 Schofield ............ B60C 23/0416
340/442
2005/0173986 A1* 8/2005 Hara .................... B60R 25/1001
307/10.1
2005/0256619 A1* 11/2005 Hayashi .............. B60C 23/0401
701/29.6
2006/0025897 A1* 2/2006 Shostak ................ B60C 23/005
701/1
2009/0080703 A1* 3/2009 Hammerschmidt .. G06T 7/0004
382/104
2009/0231115 A1* 9/2009 Tanaka ................ B60C 23/0416
340/447

(Continued)

FOREIGN PATENT DOCUMENTS

CN 103029681 A 4/2013
CN 104859591 A 8/2015
(Continued)

OTHER PUBLICATIONS

FOBO Tire, The World's First All Bluetooth Smart TPMS, https://myfobo.com/Product/FOBOTIRE, Downloaded Nov. 28, 2016.
(Continued)

*Primary Examiner* — Quan-Zhen Wang
*Assistant Examiner* — Stephen Burgdorf
(74) *Attorney, Agent, or Firm* — James P. Muraff; Neal, Gerber & Eisenberg LLP

(57) ABSTRACT

Method and apparatus are disclosed for monitoring tires of vehicles via personal area networks. An example vehicle includes a body, nodes spaced apart on the body, a tire, a transceiver coupled to the tire, and a tire detector. The tire detector is to determine a tire position based on wireless communication between the transceiver and the nodes, identify a duration that the tire is at the tire position, and present a warning to rotate the tire position when the duration is greater than a predetermined threshold.

18 Claims, 5 Drawing Sheets

(56) References Cited

U.S. PATENT DOCUMENTS

| | | | | |
|---|---|---|---|---|
| 2009/0299656 A1* | 12/2009 | Koguchi | ............... | G07C 5/085 |
| | | | | 702/42 |
| 2010/0087985 A1* | 4/2010 | Boss | ...................... | G07C 5/008 |
| | | | | 701/33.4 |
| 2010/0164704 A1* | 7/2010 | Lindskog | ............. | B60C 23/062 |
| | | | | 340/442 |
| 2012/0126967 A1* | 5/2012 | McCormick | ........ | B60C 23/0408 |
| | | | | 340/445 |
| 2012/0235807 A1* | 9/2012 | Rysenga | ............ | B60C 23/0472 |
| | | | | 340/445 |
| 2012/0291537 A1* | 11/2012 | Honda | ................. | G01M 17/02 |
| | | | | 73/146 |
| 2014/0073260 A1* | 3/2014 | Bettecken | ........... | B60C 23/0416 |
| | | | | 455/66.1 |
| 2015/0155007 A1* | 6/2015 | Barfield, Jr. | ............ | G06T 15/20 |
| | | | | 386/278 |
| 2015/0158347 A1* | 6/2015 | Fritz | ................... | B60C 23/0401 |
| | | | | 340/442 |
| 2016/0159274 A1* | 6/2016 | Salter | ................. | B60C 23/0406 |
| | | | | 315/77 |
| 2016/0247329 A1* | 8/2016 | Lavoie | ................... | G07C 5/006 |
| 2016/0303925 A1* | 10/2016 | Liu | ..................... | B60C 23/0479 |

FOREIGN PATENT DOCUMENTS

| | | |
|---|---|---|
| CN | 105946472 A | 9/2016 |
| KR | 20160027347 A | 3/2016 |
| WO | WO 2015051534 A1 | 4/2015 |

OTHER PUBLICATIONS

Search Report dated Aug. 2, 2018 for GB Patent Application No. 1802282.2 (4 Pages).

* cited by examiner

MONITORING TIRES OF VEHICLES VIA PERSONAL AREA NETWORKS

TECHNICAL FIELD

The present disclosure generally relates to vehicle tires and, more specifically, monitoring tires of vehicles via personal area networks.

BACKGROUND

Vehicles oftentimes include tires that are coupled to respective wheel rims of the vehicles. Typically, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., fuel economy) during operation of a vehicle. A tire may also include a tread (i.e., grooved patterns) on its outer surface that engages a road surface of a road to further improve handling during operation of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for monitoring tires of vehicles via personal area networks. An example disclosed vehicle includes a body, nodes spaced apart on the body, a tire, a transceiver coupled to the tire, and a tire detector. The tire detector is to determine a tire position based on wireless communication between the transceiver and the nodes, identify a duration that the tire is at the tire position, and present a warning to rotate the tire position when the duration is greater than a predetermined threshold.

An example disclosed method for monitoring vehicle tire positions via personal area networks includes determining, via a processor, a position of a tire based on wireless communication between a transceiver coupled to the tire and nodes spaced apart on a vehicle body. The example disclosed method also includes identifying a duration that the tire is at the position and presenting, in response to the duration being greater than a predetermined threshold, a warning to rotate the position.

An example disclosed tangible computer readable medium includes instructions which, when executed, cause a machine to determine, via a processor, a position of a tire based on wireless communication between a transceiver coupled to the tire and nodes spaced apart on a vehicle body. The instructions which, when executed, also cause the machine to identify a duration that the tire is at the position and present, in response to the duration being greater than a predetermined threshold, a warning to rotate the position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
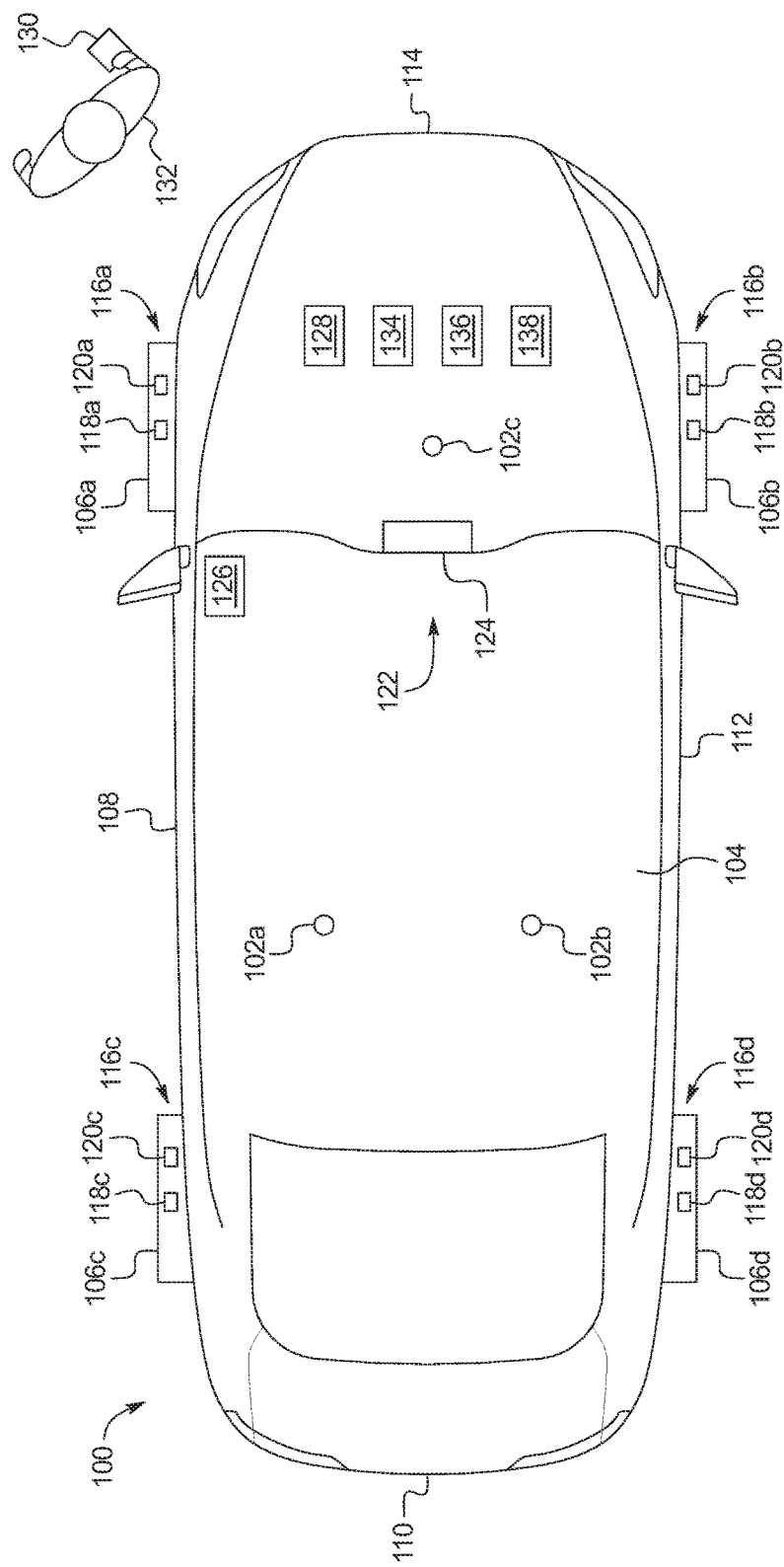
FIG. 1 illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Vehicles typically include tires that are coupled to respective wheel rims. Generally, the tires are formed of rubber (e.g., synthetic rubber, natural rubber), fabric, wiring, and/or other materials and chemical compounds that reduce wear-and-tear of the wheels, improve handling, and/or affect other vehicle characteristics (e.g., improve fuel economy) during operation of a vehicle. Oftentimes a tire includes a tread (i.e., grooved patterns) on its outer surface that engages a road surface of a road to further improve handling during operation.

The tread of the tire potentially may wear away over time as forces and/or pressure is applied to the tire during operation of the vehicle. In some instances, a location at which the tire is coupled to the body may affect the wear of the tire over time. For example, if a tire is located at a front driver-side wheel well for an extended period of time (e.g., 20,000 miles), tread located along an inner side of the of the tire may wear over time. In some instances, tires are rotated from one position of a vehicle (e.g., a front driver-side wheel well) to another (e.g., a back passenger-side wheel well) after a predetermined period of time to reduce the affects of tire wear on the performance of the tires and/or the vehicle after time. However, users of vehicles potentially may forget how long one or more of the tires are at corresponding locations of the vehicle.

Example apparatus, methods, and computer readable media disclosed herein include tire transceivers that wirelessly communicate with communication nodes located on a body of a vehicle to determine locations of corresponding tires of the vehicle. The examples disclosed herein monitor the locations of the tires and present a warning to a user (e.g., vehicle occupants such as drivers and/or passengers) of a tire that is scheduled for maintenance (e.g., rotation from one tire position of the vehicle to another) and/or is removed (e.g., stolen) from the body of the vehicle.

The example vehicles disclosed herein include a body, communication nodes (e.g., wireless personal area network nodes) spaced apart on the body, a tire, and a transceiver (e.g., a wireless personal area network transceiver) coupled to the tire and communicatively coupled to the communication nodes. A tire detector determines a tire position based on wireless communication between the transceiver and the communication nodes. As used herein, a "position of a tire" and a "tire position" refer to a location of a tire relative to a body of a vehicle. Example tire positions include wheel wells (e.g., a front driver-side wheel well, a rear passenger-side wheel well, etc.) of a body of a vehicle.

Further, the tire detector identifies a duration that the tire has been at the tire position and presents a warning (e.g., a first warning) to rotate the tire position when the duration is greater than a predetermined threshold (e.g., 1 year, 10,000 miles of travel, etc.). As used herein, a "duration" refers to a period of time during which a tire is located at a particular tire position. For example, the duration is a measurement of time (e.g., 1.5 years) and/or a measurement of a distance traveled by a vehicle while a tire is at a particular tire position (e.g., 12,500 miles). As used herein, "rotating a tire" and "rotating a tire position" refer to moving a tire from being coupled to a vehicle at one wheel well (e.g., a front passenger-side wheel well) of the vehicle to being coupled to the vehicle at another wheel well (e.g., a back driver-side wheel well) of the vehicle. For example, tires are rotated to even out tire wear (e.g., wear of tread patterns of tires) that occur over time due to different forces being applied to the tires at different tire positions. As used herein, a "wheel well" refers to a recessed compartment of a body of a vehicle in which a tire is at least partially positioned when securely coupled to an axle of the vehicle.

In some examples, the tire detector determines distances between the transceiver of the tire and the communication nodes of the body of the vehicle to determine the tire position of the tire. For example, to enable the tire detector to determine the distances, the communication nodes broadcast beacons that are to be received by the transceiver and the transceiver sends received signal strength indicators (RSSIs) to the respective communication nodes upon receiving the beacons. Further, the tire detector may adjust a rate at which the nodes broadcast beacons based on a location of the vehicle.

The communication nodes may include a first node, a second node, and a third node. The communication nodes are spaced apart from a wheel well by different distances relative to the other communication nodes to enable the tire detector to determine, via triangulation, when the tire position is at the wheel well. In some examples, the first node, the second node, and the third node form a triangle on the body of the vehicle. For example, the first node is positioned toward a first side (e.g., a driver side) and a first end (e.g., a back end) of the body of the vehicle, the second node is positioned toward a second side (e.g., a passenger side) and the first end of the body, and the third node is positioned toward a second end (e.g., a front end) of the body.

In some examples, the tire detector presents a second warning based on the duration of the tire at the tire position and a tire pressure of the tire. A tire pressure sensor (e.g., a tire pressure monitoring system (TPMS) sensor) is coupled to the tire and measures a tire pressure of the tire. The tire detector receives the tire pressure, for example, via the transceiver of the tire and the communication nodes of the body. In some examples, the tire detector presents a third warning based on the duration of the tire at the tire position and a vehicle speed during turning maneuvers of the vehicle. The vehicle includes a gyroscope to detect a vehicle orientation and a vehicle speed sensor to detect the vehicle speed to determine the vehicle speed during the turning maneuvers of the vehicle. In some examples, the tire detector presents a fourth warning when the tire is decoupled from an axle and remove from a corresponding wheel well of the body of the vehicle. The vehicle may include a communication module that communicatively couples to a mobile device of a user (e.g., a driver) to enable the tire detector to present warnings via the mobile device.

The example vehicles may include a plurality of tires and a plurality of transceivers such that each of the plurality of transceivers is coupled to a respective one of the plurality of tires. In some such examples, each of the transceivers is spaced apart from the communication nodes by distances that are different than that of the other of the plurality of transceivers to enable the tire detector to determine the tire position of each of the plurality of tires.

Turning to the figures, FIG. 1 illustrates an example vehicle 100 in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a plurality of nodes 102, a body 104, and a plurality of tires 106.

In the illustrated example, the nodes 102 are short-range wireless nodes (e.g., wireless personal area network nodes) for a wireless personal area network of the vehicle 100. The nodes 102 include hardware and firmware to communicatively couple to and establish wirelessly communication with one or more nearby devices (e.g., transceivers, transmitters, receivers, etc.). For example, the nodes 102 are Bluetooth® wireless nodes that implement the Bluetooth and/or Bluetooth Low Energy (BLE) protocols. The Bluetooth and BLE protocols are set forth in Volume 6 of the Bluetooth Specification 4.0 (and subsequent revisions) maintained by the Bluetooth Special Interest Group.

In the illustrated example, the nodes 102 include a node 102a (e.g., a first node), a node 102b (e.g., a second node), and a node 102c (e.g., a third node). The nodes 102a, 102b, 102c are spaced apart from each other such that a triangle is formed between the nodes 102a, 102b, 102c on the body 104 of the vehicle 100. The node 102a is located toward a first side 108 (e.g., a driver side) and a first end 110 (e.g., a back end) of the body 104 of the vehicle 100, the node 102b is located toward a second side 112 (e.g., a passenger side) and the first end 110, and the node 102c is located toward a second end 114 (e.g., a front end). In other examples, a different number of the nodes 102 may be located on the body 104 of the vehicle 100 and/or one or more of the nodes 102 may be located at different positions on the body 104 of the vehicle 100.

The tires 106 of the illustrated example includes a tire 106a (e.g., a first tire), a tire 106b (e.g., a second tire), a tire 106c (e.g., a third tire), and a tire (e.g., a fourth tire). Each of the tires 106 are coupled to the body 104 of the vehicle 100 at different respective wheel wells 116 of the body 104 of the vehicle 100. For example, the tire 106a is at a wheel well 116a (e.g., a first wheel well, a front driver-side wheel well), the tire 106b is at a wheel well 116b (e.g., a second wheel well, a front passenger-side wheel well), the tire 106c is at a wheel well 116c (e.g., a third wheel well, a back driver-side wheel well), and the tire 106*d* is at a wheel well 116*d* (e.g., a fourth wheel well, a back passenger-side wheel well).

Further, the tires 106 of the vehicle 100 include respective transceivers 118 and tire pressure sensors 120. For example, a transceiver 118*a* (e.g., a first transceiver) and a tire pressure sensor 120*a* (e.g., a first tire pressure sensor) are coupled to the tire 106*a*, a transceiver 118*b* (e.g., a second transceiver) and a tire pressure sensor 120*b* (e.g., a second tire pressure sensor) are coupled to the tire 106*b*, a transceiver 118*c* (e.g., a third transceiver) and a tire pressure sensor 120*c* (e.g., a third tire pressure sensor) are coupled to the tire 106*c*, and a transceiver 118*d* (e.g., a fourth transceiver) and a tire pressure sensor 120*d* (e.g., a fourth tire pressure sensor) are coupled to the tire 106*d*. The transceivers 118 are short-range wireless transceivers (e.g., wireless personal area network transceivers) that communicatively couple and wirelessly communicate with the nodes 102 of the wireless personal area network of the vehicle 100. The transceivers 118 include hardware and firmware to communicatively couple to and establish wirelessly communication with one or more nearby devices (e.g., transceivers, transmitters, receivers, etc.). For example, the transceivers 118 are Bluetooth® wireless nodes that implement the Bluetooth and/or Bluetooth Low Energy (BLE) protocols. Additionally, each of the tire pressure sensors 120 (e.g., TPMS sensors) measure a tire pressure of a respective one of the tires 106.

In the illustrated example, the vehicle includes an infotainment head unit 122 that provides an interface between the vehicle 100 and a user. The infotainment head unit 122 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a display 124 (e.g., a heads-up display, a center console display such as a liquid crystal display (LCD), an organic light emitting diode (OLED) display, a flat panel display, a solid state display, etc.), and/or a speaker 126. In the illustrated example, the infotainment head unit 122 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 122 displays the infotainment system on, for example, the display 124.

The vehicle 100 of the illustrated example also includes a communication module 128 that is to communicatively coupled to and wirelessly communicate with a mobile device 130 (e.g., a smart phone, a wearable, a smart watch, a tablet, etc.) of a user 132 (e.g., an occupant, a driver, a passenger) of the vehicle 100. The communication module 128 includes wired or wireless network interfaces to enable communication with external networks. The communication module 128 also includes hardware (e.g., processors, memory, storage, antenna, etc.) and software to control the wired or wireless network interfaces. In the illustrated example, the communication module 128 includes one or more communication controllers for standards-based networks (e.g., Global System for Mobile Communications (GSM), Universal Mobile Telecommunications System (UMTS), Long Term Evolution (LTE), Code Division Multiple Access (CDMA), WiMAX (IEEE 802.16m), Near Field Communication (NFC), local area wireless network (including IEEE 802.11 a/b/g/n/ac or others), dedicated short range communication (DSRC), and Wireless Gigabit (IEEE 802.11ad), etc.). In some examples, the communication module 128 includes a wired or wireless interface (e.g., an auxiliary port, a Universal Serial Bus (USB) port, a Bluetooth® wireless node, etc.) to communicatively couple with the mobile device 130. In such examples, the vehicle 100 may communicated with the external network via the mobile device 130. The external network(s) may be a public network, such as the Internet; a private network, such as an intranet; or combinations thereof, and may utilize a variety of networking protocols now available or later developed including, but not limited to, TCP/IP-based networking protocols.

In the illustrated example, the vehicle 100 also includes a global positioning system (GPS) receiver 134, a camera 136, and a tire detector 138. For example, the GPS receiver 134 receives a signal from a global positioning system to monitor and/or determine a location of the vehicle 100. The camera 136 is located on the body 104 of the vehicle 100 such that the camera 136 collects, captures and/or otherwise obtains images and/or video of an environment in which the vehicle 100 is located. Further, the tire detector 138 monitors the positions of the respective tires 106 to determine whether to present a warning to the user 132 based on the tire positions.

In operation, the tire detector 138 determines the position of the tires 106 based on wireless communication between the transceivers 118 of the tires 106 and the nodes 102 of the body 104 of the vehicle 100. To determine the locations of the tires 106, the tire detector determines distances between the transceivers 118 and the nodes 102. For example, the nodes 102 broadcast beacons that are received by the transceivers 118, the transceivers 118 send corresponding received signal strength indicators (RSSIs) back to the nodes 102 upon receiving the beacons, and the tire detector 138 determine the distances between the transceivers 118 and the nodes 102 based on the RSSIs. In the illustrated example including the three nodes 102*a*, 102*b*, 102*c*, the tire detector 138 utilizes triangulation to determine the location of the transceivers 118 and, thus, the tires 106 based on the corresponding distances to the nodes 102*a*, 102*b*, 102*c*. In other examples in which the body 104 of the vehicle 100 includes a single node, the tire detector 138 utilizes the RSSIs sent from the transceivers 118 to determine the locations of the corresponding tires 106. In some examples, the tire detector 138 adjusts a rate at which the nodes 102 broadcast the beacons based on the location of the vehicle 100 that the tire detector 138 determines via, for example, the GPS receiver 134 and/or the camera 136 of the vehicle 100.

Further, the tire detector 138 identifies a duration that the tires 106 have been at the corresponding positions. The tire detector 138 presents a warning (e.g., via the display 124, the speaker 126, the mobile device 130, etc.) when the duration associated with one of the tires 106 is greater than a predetermined threshold (e.g., 10,000 miles of travel, etc.). For example, if the tire 106*a* has been coupled to the body 104 of the vehicle 100 at the wheel well 116*a* for more than 10,000 miles of travel, the tire detector 138 sends a warning to the user 132 to rotate the tire 106*a* to another one of the wheel wells 116*b*, 116*c*, 116*d* of the vehicle 100.

Additionally or alternatively, the tire detector 138 presents another warning (e.g., second warning) to the user 132 for one or more of the tires 106 based on the duration at which one of the tires 106 is at the corresponding tire position and the tire pressure measured by the corresponding one of the tire pressure sensors 120. For example, the transceivers 118 of the tires 106 send the tire pressures measured by the corresponding tire pressure sensors 120 to the tire detector 138 via the nodes 102 of the vehicle 100. The tire detector 138 may present another warning (e.g., a third warning) for one or more of the tires 106 based on the duration at which one of the tires 106 is at the corresponding tire position and a vehicle speed during turning maneuvers of the vehicle 100. For example, the tire detector 138 presents a warning to rotate the tires 106 in response to determining the vehicle 100 has made repeated sharp turns (e.g., hard right turns at high velocities) and the one or more of the tires 106 have been at their respective positions for at least a reduced predetermined threshold (e.g., 8,000 miles of travel). In some examples, the tire detector 138 determines the vehicle speed during turning maneuvers based measurements taken by a gyroscope (e.g., a gyroscope 416 of FIG. 4) and a vehicle speed sensor (e.g., a vehicle speed sensor 414 of FIG. 4). The tire detector 138 may present another warning (e.g., a fourth warning) when one or more of the tires 106 is decoupled from the body 104 of the vehicle 100 (e.g., when one of the tires 106 is removed from the corresponding one of the wheel wells 116).

Figure 2:
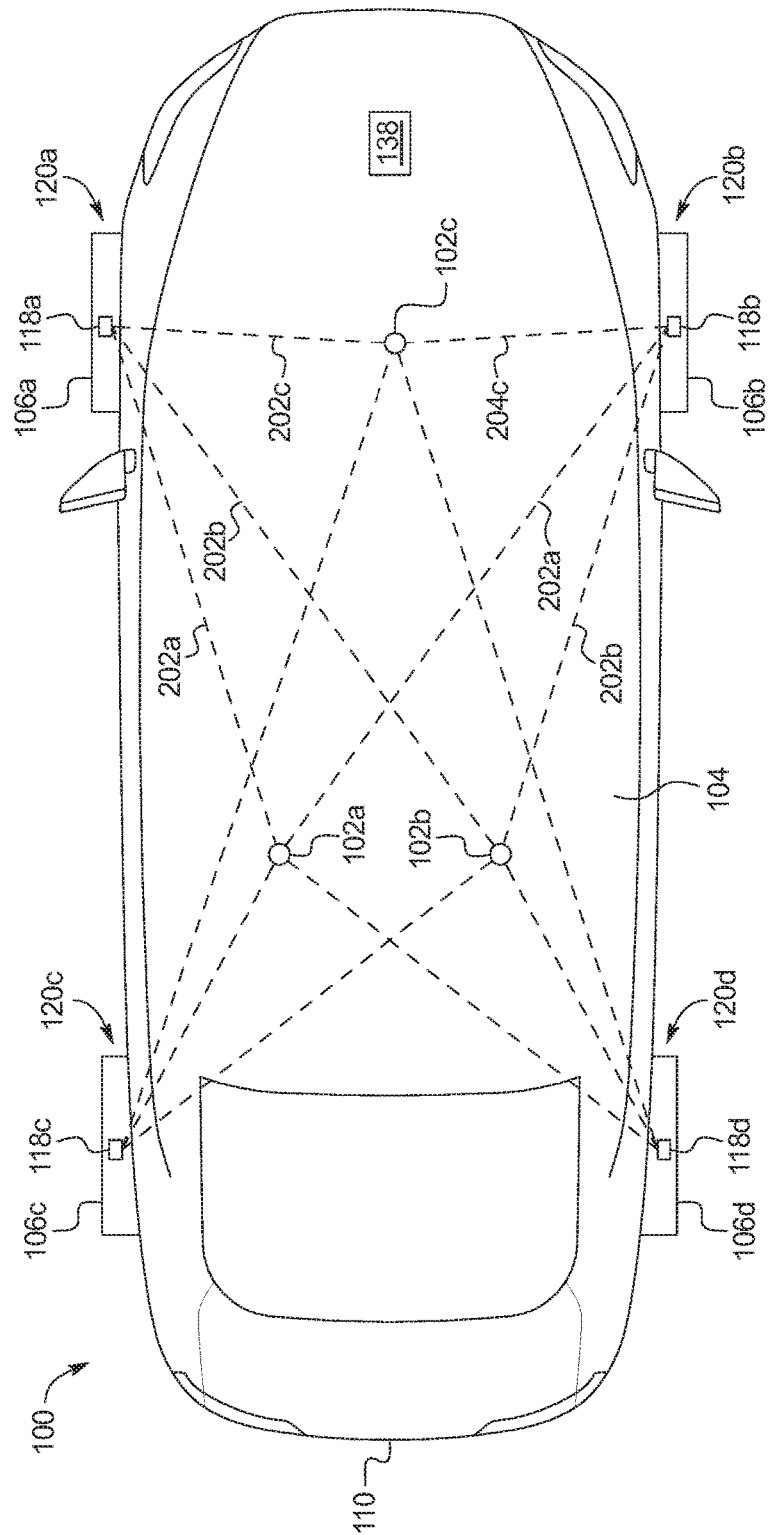
FIG. 2 illustrates transceivers of tires in wireless communication with nodes of a body of the vehicle of FIG. 1.

FIG. 2 illustrates the transceivers 118 of the tires 106 in wireless communication with the nodes 102 located on the body 104 of the vehicle 100. In the illustrated example, the tires 106a, 106b, 106c, 106d are located at the respective wheel wells 116a, 116b, 116c, 116d of the vehicle 100. The tire detector 138 determines that the tires 106 are at the wheel wells 116 based on the RSSIs that are wirelessly communicated from the transceivers 118 of the tires 106 to the nodes 102a, 102b, 102c of the body 104 of the vehicle 100. In some examples, each of the nodes 102 and the transceivers 118 have respective identification numbers that are included in signals sent to and/or from the nodes 102 and the transceivers 118 to enable the tire detector 138 to determine which RSSI and corresponding distance corresponds to which of the nodes 102 and the transceivers 118.

In the illustrated example, the tire detector 138 determines that the tire 106a is spaced apart from the node 102a by a distance 202a (e.g., a first distance), is spaced apart from the node 102b by a distance 202b (e.g., a second distance), and is spaced apart from the node 102c by a distance 202c (e.g., a third distance). Based on the distances 202a, 202b, 202c and the locations of the nodes 102a, 102b, 102c, the tire detector 138 utilizes triangulation to determine that the tire 106a is at the wheel well 116a. For example, the tire detector 138 compares the determined location of the tire 106a to a location of the wheel well 116a to determine that the tire 106a is located at the wheel well 116a. Further, the tire detector 138 determines that the tire 106b is spaced apart from the node 102a by a distance 204a, is spaced apart from the node 102b by a distance 204b, and is spaced apart from the node 102c by a distance 204c. Based on the distances 204a, 204b, 204c and the locations of the nodes 102a, 102b, 102c, the tire detector 138 utilizes triangulation to determine that the tire 106a is at the wheel well 116b. As illustrated in FIG. 2, the nodes 102 are positioned on the body 104 of the vehicle 100 (e.g., forming a triangle) such that the distances 202a, 202b, 202c corresponding to the tire 106a are different than the distances 204a, 204b, 204c corresponding to the tire 106b to enable the tire detector 138 to differentiate between the position of the tire 106a and the position of the tire 106b. That is, each of the nodes 102 are spaced apart from the wheel wells 116 by different distances to enable the tire detector 138 to determine, via triangulation, when the tires 106 (and the corresponding transceivers 118) are positioned in the wheel wells 116 and/or in which of the wheel wells 116 each of the tires 106 are positioned.

Figure 3:
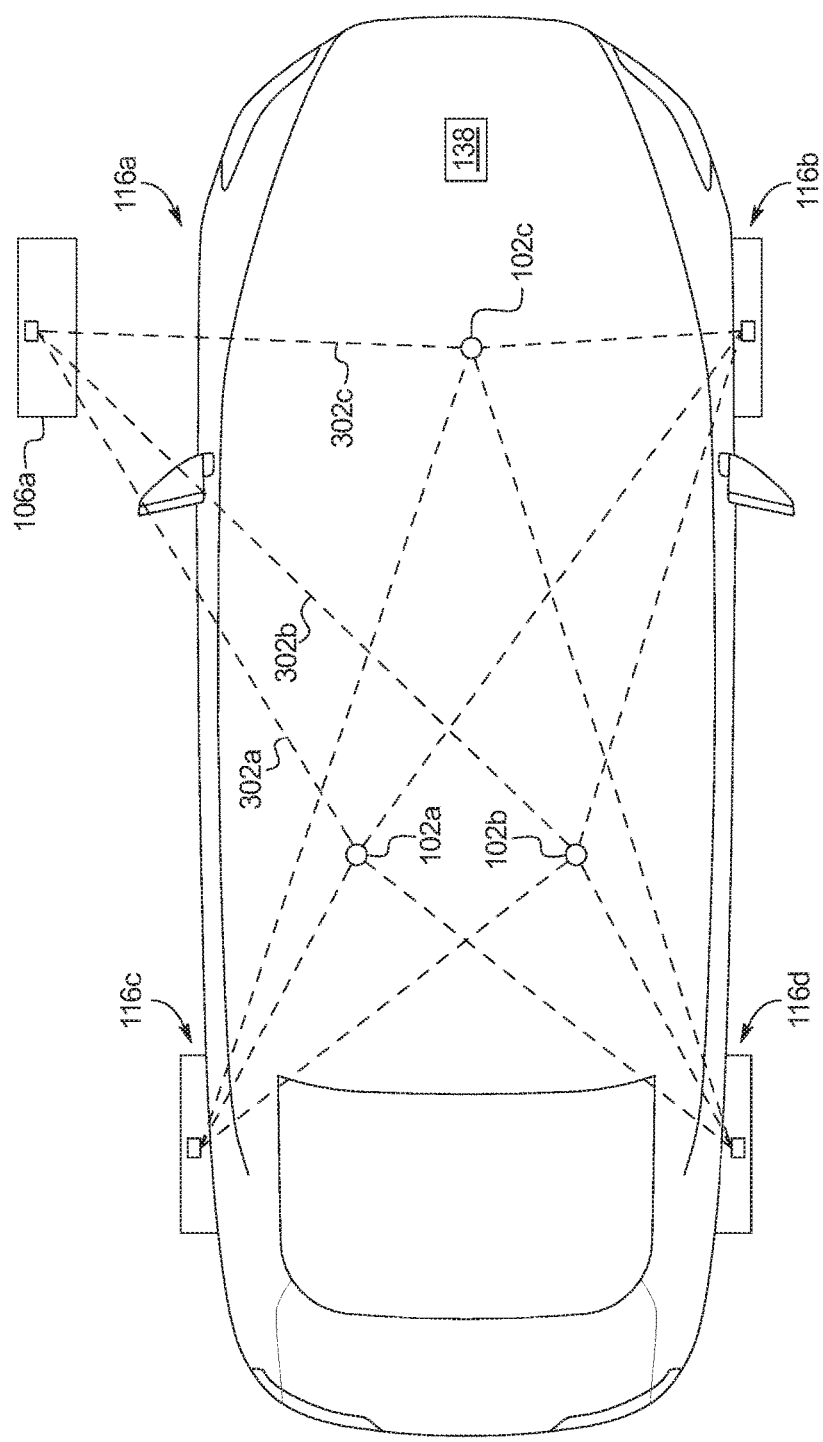
FIG. 3 illustrates a transceiver of a tire decoupled from the body of the vehicle that is in wireless communication with the nodes of FIG. 2.

FIG. 3 illustrates the tire 106a decoupled from the body 104 of the vehicle 100. In the illustrated example, the tire detector 138 determines that the tire 106a is spaced apart from the node 102a by a distance 302a, is spaced apart from the node 102b by a distance 302b, and is spaced apart from the node 102c by a distance 302c. Based on the distances 302a, 302b, 302c, the tire detector 138 determines the location of the tire 106a. Further, by comparing the determined location of the tire 106a to the respective locations of the wheel wells 116 of the vehicle 100, the tire detector 138 determines that the tire 106a is not located at any of the wheel wells 116 and, thus, is decoupled from the body 104 of the vehicle 100. Upon detecting that the tire 106a is decoupled from the body 104, the tire detector 138 present a warning to the user 132 (e.g., via the mobile device 130).

Figure 4:
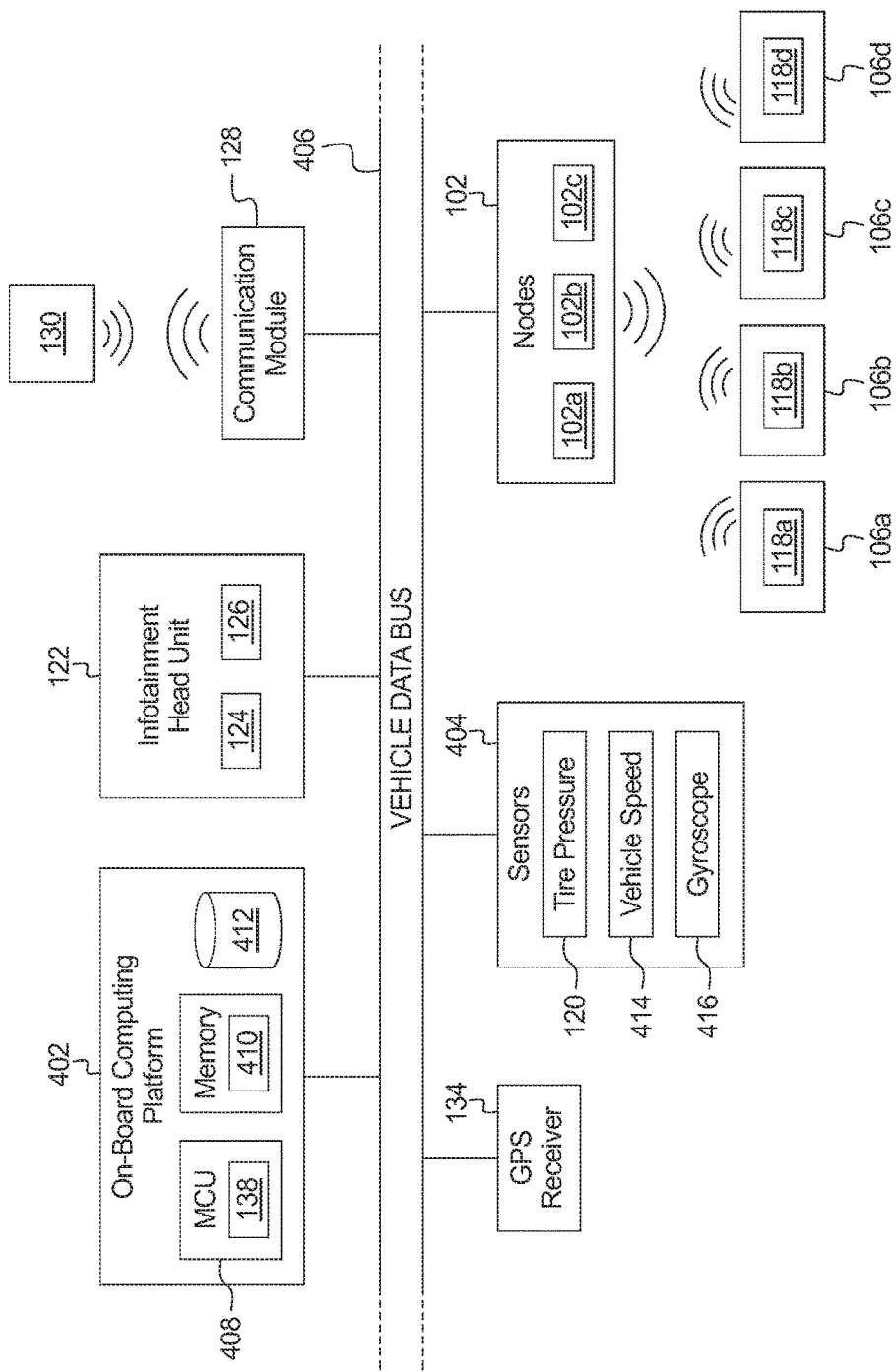
FIG. 4 is a block diagram of electronic components of the vehicle of FIG. 1.

FIG. 4 is a block diagram of electronic components 400 of the vehicle 100. As illustrated in FIG. 4, the electronic components 400 include an on-board computing platform 402, the infotainment head unit 122, the communication module 128, the GPS receiver 134, sensors 404, the nodes 102, and a vehicle data bus 406.

The on-board computing platform 402 includes a microcontroller unit, controller, or processor 408; memory 410; and a database 412. For example, the tire detector 138 of the processor 408 performs instructions of the memory 410 to determine the positions of the tires 106. The memory 410 also includes instructions for the tire detector 138 to perform that compare the positions of the tires 106 to wheel well positions of the vehicle 100 (e.g., a front driver-side wheel well, a back passenger-side wheel well, etc.) stored in the database 412 to determine whether any of the tires 106 are decoupled from the vehicle 100 (e.g., removed from the respective wheel wells 116). In some examples, the processor 408 of the on-board computing platform 402 is structured to include the tire detector 138. Alternatively, in some examples, the tire detector 138 is incorporated into another electronic control unit (ECU) with its own processor 408, memory 410, and database 412.

The processor 408 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 410 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 410 includes multiple kinds of memory, particularly volatile memory and non-volatile memory.

The memory 410 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 410, the computer readable medium, and/or within the processor 408 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

As illustrated in FIG. 4, the infotainment head unit 122 includes the display 124 and the speaker 126. The communication module 128 is to wirelessly communicate with the mobile device 130, for example, to present a warning to the user 132 via the mobile device 130. Further, the GPS receiver 134 receives a signal from a global positioning system to determine a location of the vehicle 100.

The sensors 404 are arranged in and around the vehicle 100 to monitor properties of the vehicle 100 and/or an environment in which the vehicle 100 is located. One or more of the sensors 404 may be mounted to measure properties around an exterior of the vehicle 100. Additionally or alternatively, one or more of the sensors 404 may be mounted inside a cabin of the vehicle 100 or in a body of the vehicle 100 (e.g., an engine compartment, wheel wells, etc.) to measure properties in an interior of the vehicle 100. For example, the sensors 404 include accelerometers, odometers, tachometers, pitch and yaw sensors, wheel speed sensors, microphones, tire pressure sensors, biometric sensors and/or sensors of any other suitable type. In the illustrated example, the sensors 404 include the tire pressure sensors 120, a vehicle speed sensor 414, and a gyroscope 416. Each of the tire pressure sensors 120 measure a tire pressure of a respective one of the tires 106. Further, the vehicle speed sensor 414 detects a speed of the vehicle 100 and the gyroscope 416 detects an orientation of the vehicle 100. For example, the vehicle speed sensor 414 detects the speed and the gyroscope 416 detects the orientation during turning maneuvers of the vehicle 100 to enable the tire detector 138 to determine whether the turning maneuvers affect when one or more of the tires 106 are to be rotated to different positions.

As illustrated in FIG. 4, the nodes 102 of the body 104 of the vehicle 100 include the node 102a, the node 102b, and the node 102c. The nodes 102 wirelessly communicate with the transceivers 118 of the tires 106 to monitor the respective positions of the tires 106. For example, the nodes 102a, 102b, 102c wirelessly communicates with the transceiver 118a to enable the tire detector 138 to monitor the position of the tire 106a, the transceiver 118b to enable the tire detector 138 to monitor the position of the tire 106b, the transceiver 118c to enable the tire detector 138 to monitor the position of the tire 106c, and the transceiver 118d to enable the tire detector 138 to monitor the position of the tire 106d.

The vehicle data bus 406 communicatively couples the nodes 102, the infotainment head unit 122, the communication module 128, the GPS receiver 134, the on-board computing platform 402, and the sensors 404. In some examples, the vehicle data bus 406 includes one or more data buses. The vehicle data bus 406 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an EthernetTM bus protocol IEEE 802.3 (2002 onwards), etc.

Figure 5:
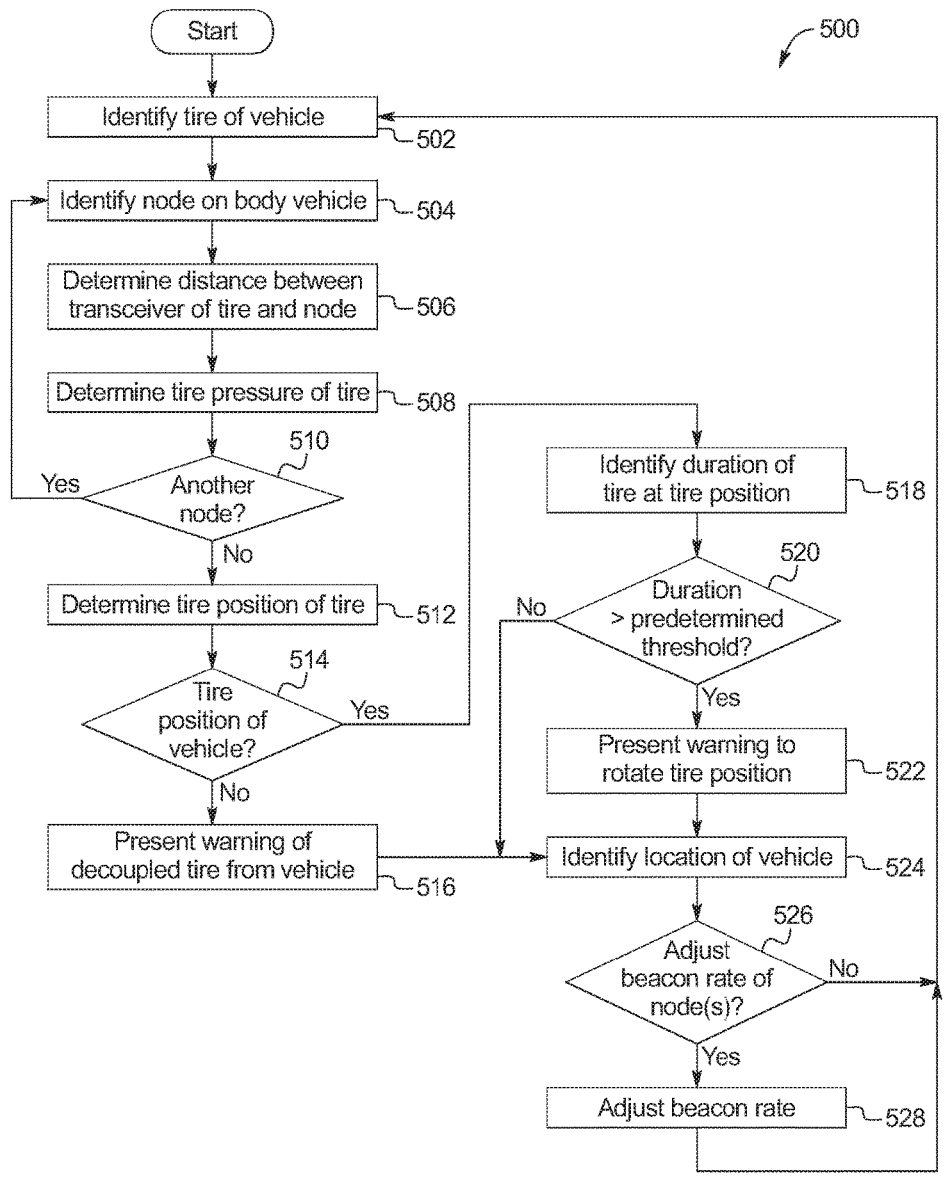
FIG. 5 is a flowchart for monitoring positions of tires of the vehicle of FIG. 1 via a personal area network in accordance with the teachings herein.

FIG. 5 is a flowchart of an example method 500 to monitor tires of vehicles via personal area networks. The flowchart of FIG. 5 is representative of machine readable instructions that are stored in memory (such as the memory 410 of FIG. 4) and include one or more programs which, when executed by a processor (such as the processor 408 of FIG. 4), cause the vehicle 100 to implement the example tire detector 138 of FIGS. 1-4. While the example program is described with reference to the flowchart illustrated in FIG. 5, many other methods of implementing the example tire detector 138 may alternatively be used. For example, the order of execution of the blocks may be rearranged, changed, eliminated, and/or combined to perform the method 500. Further, because the method 500 is disclosed in connection with the components of FIGS. 1-4, some functions of those components will not be described in detail below.

Initially, at block 502, the tire detector 138 identifies one of the tires 106 (e.g., the tire 106a). For example, the tire detector 138 identifies the tire 106a via an identification number of the transceiver 118a coupled to the tire 106a. At block 504, the tire detector 138 identifies one of the nodes 102 (e.g., the node 102a) located on the body 104 of the vehicle 100. For example, the tire detector 138 identifies the node 102a via an identification number of the node 102a. At block 506, the tire detector 138 determines the distance (e.g., the distance 202a of FIG. 2, the distance 302a of FIG. 3) between the transceiver 118a of the tire 106a and the node 102a of the vehicle 100. In some examples, the the tire detector 138 determines the distance based on the RSSI sent from the transceiver 118a to the node 102a. Further, at block 508, the tire pressure sensor 120a of the tire 106a determines the tire pressure of the tire 106a and sends the measured tire pressure to the tire detector 138 via the transceiver 118a of the tire 106a and the communication module 128 of the vehicle 100. At block 510, the tire detector 138 determines whether there is another of the nodes 102 located on the body 104 of the vehicle 100. The method 500 returns to block 504 in response to the tire detector 138 determining that there is another of the nodes 102 (e.g., the node 102b, 102c).

Otherwise, in response to the tire detector 138 determining that there is not another of the nodes 102, the method 500 proceeds to block 512 at which the tire detector 138 determines the tire position of the tire 106a. For example, the tire detector 138 determines the tire location based on the distance between the transceiver 118a and the node 102a (e.g., the distance 202a of FIG. 2, the distance 302a of FIG. 3), the distance between the transceiver 118a and the node 102b (e.g., the distance 202b of FIG. 2, the distance 302b of FIG. 3), and/or the distance between the transceiver 118a and the node 102c (e.g., the distance 202c of FIG. 2, the distance 302c of FIG. 3). In some examples, the tire detector 138 utilizes triangulation to increase an accuracy of the tire location of the tire 106a determined by the tire detector 138.

At block 514, the tire detector 138 determines whether the tire position corresponds to one of the wheel wells 116 of the vehicle 100. In response to determining that the tire position does not correspond to one of the wheel wells 116, the tire detector 138 presents a warning to the user 132 that the tire 106a is stolen, removed and/or otherwise decoupled from the body 104 of the vehicle 100 (block 516).

Otherwise, in response to the tire detector 138 determining that the tire position corresponds to one of the wheel wells 116, the method 500 proceeds to block 518 at which the tire detector 138 identifies a duration at which the tire 106a has been located at the corresponding tire position of the vehicle 100 (e.g., the wheel well 116a) (block 518). For example, the predetermined threshold is based on a distance of travel (e.g., 10,000 miles of travel) and/or an amount of time (e.g., 1 year) when the tire 106a is at that tire position. The predetermined threshold further also may be based on the tire pressure. For example, the predetermined threshold may be reduced (e.g., 9,000 miles) when the tire 106a is overinflated. Additionally or alternatively, the predetermined threshold further also may be based on the speed of the vehicle 100 during turning maneuvers. For example, the tire detector 138 reduces the predetermined threshold (e.g., 8,000 miles of travel) in response to determining the vehicle 100 has made repeated sharp turns (e.g., hard right turns at high velocities) while one or more of the tires 106 have been at their respective positions. The tire detector 138 may determine the speed of the vehicle 100 during turning members based on measurements taken via the vehicle speed sensor 414 and the gyroscope 416.

At block 520, the tire detector 138 determines whether the duration is greater than a predetermined threshold. In response the tire detector 138 determining that the duration is greater than the predetermined threshold, the tire detector 138 presents a warning to the user 132 (block 522). For example, the tire detector 138 presents the warning via the display 124, the speaker 126, the mobile device 130, etc. At block 524, the tire detector 138 determines a location and/or surroundings of the vehicle 100. For example, the tire detector 138 determines the vehicle location upon presenting the warning at block 516, upon determining at block 520 that the duration is not greater than the predetermined threshold, or upon presenting the warning at block 522. In some examples, the tire detector 138 utilizes the GPS receiver 134 and/or the camera 136 to determine the location and/or surroundings of the vehicle 100. At block 526, the tire detector 138 determines whether to adjusts rates at which the nodes 102 broadcast the respective beacons based on the location and/or surroundings of the vehicle 100. In response to the tire detector 138 determining that the beacon rates are not to be adjusted, the method 500 returns to block 502 for another one of the tires 106. In response to the tire detector 138 determining that the beacon rates are to be adjusted, the method 500 proceeds to block 528 at which the tire detector 138 adjusts the beacon rates of the nodes 102. After the tire detector 138 adjusts the beacon rates, the method returns to block 502 for another one of the tires 106.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a body;
    a gyroscope;
    a speed sensor;
    nodes;
    a tire:
    a transceiver coupled to the tire;
    a GPS receiver to identify a vehicle location;
    a camera to monitor vehicle surroundings; and
    a tire detector to:
        determine a tire position based on wireless communication between the transceiver and the nodes;
        identify a duration that the tire is at the tire position;
        present a warning for tire rotation when the duration exceeds a threshold;
        reduce the threshold upon detecting a sharp turn via the gyroscope and the speed sensor;
        determine whether the tire is decoupled from the body based on the wireless communication between the transceiver and the nodes;
        present a second warning when the tire is decoupled from the body; and
        adjust a rate at which the nodes broadcast beacons for the transceiver based on the vehicle location and the vehicle surroundings to facilitate monitoring for decoupling of the vehicle.

2. The vehicle of claim 1, wherein, to determine the tire position, the tire detector determines distances between the transceiver and the nodes.

3. The vehicle of claim 2, wherein, to enable the tire detector to determine the distances, the nodes broadcast the beacons and the transceiver sends received signal strength indicators to the respective nodes upon receiving the beacons.

4. The vehicle of claim 1, wherein the nodes are wireless personal area network nodes and the transceiver is a wireless personal area network transceiver.

5. The vehicle of claim 1, further including a plurality of tires that includes the tire and a plurality of transceivers that includes the transceiver, each of the plurality of transceivers is coupled to a respective one of the plurality of tires.

6. The vehicle of claim 5, wherein the nodes are positioned on the body such that each of the plurality of transceivers is spaced apart from the nodes by different distances to facilitate identification of tire locations of the plurality of tires.

7. The vehicle of claim 1, wherein the nodes includes a first node, a second node, and a third node that are each spaced apart from a wheel well by a different respective distance to enable the tire detector to determine, via triangulation, when the tire position is at the wheel well.

8. The vehicle of claim 7, wherein the first node is positioned toward a first side and a first end of the body, the second node is positioned toward a second side and the first end of the body, and the third node is positioned toward a second end of the body to form a triangle.

9. The vehicle of claim 1, further including a communication module that is to communicatively couple to a mobile device to enable the tire detector to present the warning via the mobile device.

10. The vehicle of claim 1, further including a tire pressure sensor to measure a tire pressure of the tire, the tire detector is to present the warning further based on the tire pressure.

11. The vehicle of claim 1, wherein the gyroscope is to detect a vehicle orientation and the speed sensor is to detect a vehicle speed during turning maneuvers.

12. A method, performed by a processor, comprising:
determining a position of a tire based on wireless communication between a tire transceiver and nodes spaced apart on a vehicle body;
identifying a duration of the tire at the position;
presenting a warning for tire rotation when the duration exceeds a threshold;
monitoring turns via a gyroscope and a speed sensor; and
reducing the threshold based on detection of a sharp turn and on a tire pressure measured by a pressure sensor.

13. The method of claim 12, further including determining distances between the tire transceiver and the vehicle body nodes to determine the position of the tire by broadcasting beacons via the vehicle body nodes and sending respective received signal strength indicators via the tire transceiver.

14. The method of claim 12, further including determining the position of the tire via triangulation by determining a first distance between the tire transceiver and a first of the vehicle body nodes, a second distance between the tire transceiver and a second of the vehicle body nodes, and a third distance between the tire transceiver and a third of the vehicle body nodes.

15. The method of claim 12, further including communicatively coupling to a mobile device via a communication module to enable the mobile device to present the warning via the mobile device.

16. A vehicle comprising:
a gyroscope;
a speed sensor;
nodes;
a tire;
a tire pressure sensor to measure a tire pressure of the tire;
a transceiver coupled to the tire; and
a tire detector to:
determine a tire position based on wireless communication between the transceiver and the nodes;
identify a duration that the tire is at the tire position;
present a warning for tire rotation when the duration exceeds a threshold and further based on a tire pressure measurement; and
reduce the threshold upon detecting a sharp turn via the gyroscope and the speed sensor and in response to determining, via the tire pressure sensor, that the tire is overinflated.

17. The vehicle of claim 16, wherein the tire detector receives the tire pressure measurement via the transceiver and the nodes.

18. The vehicle of claim 16, wherein the tire detector is to:
determine whether the tire is decoupled from a body of the vehicle based on the wireless communication between the transceiver and the nodes; and
present a second warning when the tire is decoupled from the body.

* * * * *